ns011180405B2

United States Patent
Yamato et al.

(10) Patent No.: US 11,180,405 B2
(45) Date of Patent: Nov. 23, 2021

(54) PLATE GLASS PRODUCTION METHOD, PLATE GLASS, AND LAMINATED GLASS PRODUCTION METHOD

(71) Applicant: AGC Inc., Chiyoda-ku (JP)

(72) Inventors: Takamitsu Yamato, Chiyoda-ku (JP); Kouhei Sunaga, Chiyoda-ku (JP); Akira Hasegawa, Chiyoda-ku (JP); Akira Sugahara, Chiyoda-ku (JP)

(73) Assignee: AGC Inc., Tokyo (JP)

( * ) Notice: Subject to any disclaimer, the term of this patent is extended or adjusted under 35 U.S.C. 154(b) by 0 days.

(21) Appl. No.: 16/814,735

(22) Filed: Mar. 10, 2020

(65) Prior Publication Data
US 2020/0207655 A1 Jul. 2, 2020

Related U.S. Application Data

(63) Continuation of application No. 15/651,572, filed on Jul. 17, 2017, now Pat. No. 10,633,277, which is a (Continued)

(30) Foreign Application Priority Data

Jan. 21, 2015 (JP) ................. 2015-009556

(51) Int. Cl.
*C03B 18/18* (2006.01)
*B32B 17/10* (2006.01)
*C03B 18/06* (2006.01)

(52) U.S. Cl.
CPC ........ *C03B 18/18* (2013.01); *B32B 17/10036* (2013.01); *C03B 18/06* (2013.01); *Y10T 428/24479* (2015.01)

(58) Field of Classification Search
CPC ... C03B 18/18; C03B 18/06; B32B 17/10036; Y19T 428/24479
See application file for complete search history.

(56) References Cited

U.S. PATENT DOCUMENTS

| 2,029,480 A | 2/1936 | Hammon |
| 3,123,954 A | 3/1964 | Calkins |
(Continued)

FOREIGN PATENT DOCUMENTS

| CN | 1642866 A | 7/2005 |
| CN | 102653074 A | 9/2012 |
(Continued)

OTHER PUBLICATIONS

Rudolf, Weissmann; "Fundamental Properties of Float Glass Surfaces". Glass Processing Days, Sep. 13-15, 1997, (pp. 40-43). <https://www.thewca.uk/wp-content/uploads/2017/08/FUNDAMENTAL-PROPERTIES-OF-FLOAT-GLASS.pdf>. (Year: 1997).*

(Continued)

*Primary Examiner* — David Sample
*Assistant Examiner* — Donald M Flores, Jr.
(74) *Attorney, Agent, or Firm* — Element IP, PLC

(57) ABSTRACT

Provided is a sheet glass production process for properly producing sheet glass having a convex shape in section in a width direction orthogonal to the advancing direction of a glass ribbon. A glass ribbon G2 advancing on molten metal 22 is heated so as to have both edge portions G2B heated more intensely than a central portion G2A in a width direction thereof in an upstream zone of the molten metal bath, and a plurality of rolls 23 are rotated in contact with both edge portions G2B of the glass ribbon G2 such that upstream rolls 23A in an advancing direction F1 have a lower peripheral speed than downstream rolls 23B in the advancing direction.

14 Claims, 5 Drawing Sheets

Related U.S. Application Data continuation of application No. PCT/JP2016/051720, filed on Jan. 21, 2016.

(56) References Cited

U.S. PATENT DOCUMENTS

| | | | |
|---|---|---|---|
| 3,575,694 | A | 4/1971 | Bigliardi et al. |
| 5,812,332 | A | 9/1998 | Freeman |
| 7,122,242 | B2 | 10/2006 | DiGiampaolo et al. |
| 2001/0044010 | A1* | 11/2001 | Freeman .......... B32B 17/10981 428/157 |
| 2003/0215610 | A1* | 11/2003 | DiGiampaolo ......... C03B 18/06 428/156 |
| 2011/0294646 | A1 | 12/2011 | Kim et al. |
| 2012/0053042 | A1* | 3/2012 | Pieters ................... C03C 15/00 501/11 |
| 2013/0306995 | A1* | 11/2013 | Park ....................... C03C 3/091 428/141 |

FOREIGN PATENT DOCUMENTS

| | | |
|---|---|---|
| JP | 64-5921 | 1/1989 |
| WO | 2009/054411 A1 | 4/2009 |
| WO | 2015/005000 A1 | 1/2015 |

OTHER PUBLICATIONS

International Search Report dated Feb. 16, 2016 in PCT/JP2016/051720 filed Jan. 21, 2016.

* cited by examiner

Fig. 6A
Fig. 6B
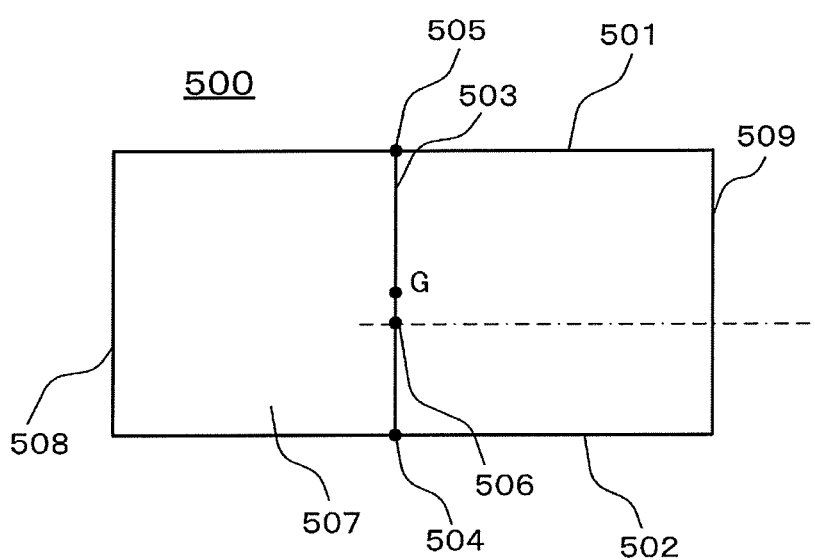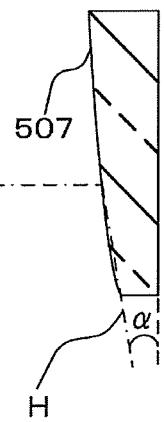

PLATE GLASS PRODUCTION METHOD, PLATE GLASS, AND LAMINATED GLASS PRODUCTION METHOD

CROSS REFERENCE TO RELATED APPLICATIONS

The present application is a continuation application of U.S. patent application Ser. No. 15/651,572, filed on Jul. 17, 2017, which is a continuation application of PCT/JP16/051720, filed on Jan. 21, 2016, the text of which is incorporated by reference, and claims priority to Japanese Patent Application No. JP 2015-009556, filed on Jan. 21, 2015, the text of which is incorporated by reference.

TECHNICAL FIELD

The present invention relates to a sheet glass production process, sheet glass, and a laminated glass production process. In particular, the present invention relates to a process for producing sheet glass having a convex shape in section in a width direction orthogonal to the advancing direction of a glass ribbon.

BACKGROUND ART

The thickness of sheet glass produced by the float process is normally constant. For example, a head-up display for displaying information on the windshield of an automobile (hereinbelow, referred to as "HUD"), however, requires glass having a non-uniform thickness in order to eliminate the generation of a double image when seen from a driver. Under such a circumstance, investigation has been made about a process for producing sheet glass having a concave shape, a convex shape or a tapered shape in section in a width direction orthogonal to the advancing direction of a glass ribbon (hereinbelow, referred simply to as the width direction at some explanations later on) (see, e.g. Patent Documents 1 and 2).

PRIOR ART DOCUMENTS

Patent Documents

Patent Document 1: U.S. Pat. No. 7,122,242
Patent Document 2: U.S. Pat. No. 3,575,694

DISCLOSURE OF INVENTION

Technical Problem

Patent document 1 fails to disclose specific data required for producing sheet glass having a convex shape in section in the width direction, and Patent Document 2 substantially discloses only a process for producing tapered glass. Under such circumstances, it could be practically impossible to properly produce sheet glass having a convex shape in section in the width direction. In particular, the production process disclosed by Patent Document 2 fails to sufficiently disclose information about the arrangement or peripheral speed of edge rolls and is unfeasible.

It is an object of the present invention to provide a process for properly producing sheet glass having a convex shape in section in a width direction orthogonal to the advancing direction of a glass ribbon (hereinbelow, also referred simply to as glass instead of sheet glass in Description). It should be noted that in the present invention, such glass having a convex shape means a glass ribbon having a greater thickness in a central portion than both edge portions in a width direction thereof, or sheet glass produced from such a glass ribbon.

Solution to Problem

The present invention provides a process for producing sheet glass including floating and advancing a glass ribbon on a molten metal surface in a molten metal bath; bringing a plurality of rolls into contact with both edge portions of the glass ribbon in a width direction of the glass ribbon to form the glass ribbon in a sheet shape; heating both edge portions of the glass ribbon more intensely than a central portion of the glass ribbon in the width direction in an upstream zone of the molten metal bath; and rotating the rolls such that upstream rolls in an advancing direction of the glass ribbon have a lower peripheral speed than downstream rolls in the advancing direction, thereby to produce sheet glass having a central portion in the width direction thereof so as to have a greater thickness than both edge portions thereof.

In accordance with the present invention, the viscosity of both edge portions is unlikely to increase by heating both edge portions of the glass ribbon in the width direction of the glass ribbon more intensely than the central portion of the glass ribbon in the width direction in the upstream zone of the molten metal bath. Thus, the glass ribbon is likely to be formed so as to be thin in both edge portions and thick in the central portion. Further, it is possible to increase the width of the glass ribbon spreading toward both sides of the rotary shafts of the upstream rolls by rotating the rolls such that the upstream rolls in the advancing direction of the glass ribbon have a lower peripheral speed than the downstream rolls in the advancing direction. Thus, the glass ribbon can be formed so as to be thin in both edge portions and thick in the central portion such that the glass ribbon is provided with a convex shape in section in the width direction.

In one mode of the process for producing sheet glass according to the present invention, it is preferred that the glass ribbon be heated by only heaters disposed adjacent to both edge portions of the glass ribbon in the width direction without substantially using a heater disposed adjacent to the central portion of the glass ribbon in the upstream zone.

In this mode, the viscosity of both edge portions in the width direction is unlikely to increase by heating the glass ribbon by only the heaters disposed adjacent to both edge portions without substantially using the heater disposed adjacent to the central portion in the upstream zone. Thus, the glass ribbon is likely to be formed so as to be thin in both edge portions and thick in the central portion.

In another mode of the process for producing sheet glass according to the present invention, it is preferred that the glass ribbon on a surface of the molten metal bath be heated at a cooling rate of at most 6.1° C./m in both edge portions in the width direction, in other words, be subjected to temperature control. In Description, when reference is made to the cooling rate in the edge portions of the glass ribbon in the width direction, the edge portions mean portions of the glass ribbon that are located 500 mm apart from the edges of the glass ribbon toward the central portion in the width direction.

In this mode, the viscosity of both edge portions in the width direction is unlikely to increase by heating the glass ribbon on the surface of the molten metal bath at a cooling rate of at most 6.1° C./m in the edge portions in the width direction. Thus, the glass ribbon is likely to be formed so as to be thin in both edge portions and thick in the central portion.

In another mode of the process for producing sheet glass according to the present invention, it is preferred that the glass ribbon be heated such that a location where the edge portions of the glass ribbon in the width direction on the surface of the molten metal bath have a viscosity of $10^{4.9}$ (dPa·sec) is at least 15 m apart from a location where the edge portions of the glass ribbon in the width direction on the surface of the molten metal bath have a viscosity of $10^{6.1}$ (dPa·sec).

In this mode, when the glass ribbon is heated such that a location where the edge portions of the glass ribbon on the surface of the molten metal bath in the width direction have a viscosity of $10^{4.9}$ (dPa·sec) is at least 15 m apart from a location where the edge portions of the glass ribbon on the surface of the molten metal bath in the width direction have a viscosity of $10^{6.1}$ (dPa·sec), the viscosity of both edge portions is unlikely to increase. Thus, the glass ribbon is likely to be formed so as to be thin in both edge portions and thick in the central portion. In Description, when reference is made to the viscosity of the edge portions the glass ribbon in the width direction, the edge portions mean portions of the glass ribbon that are located 500 mm apart from the edges of the glass ribbon toward the central portion in the width direction.

In another mode of the process for producing sheet glass according to the present invention, it is preferred that among rolls that are disposed in zones where the edge portions of the glass ribbon in the width direction on the surface of the molten metal bath have a viscosity of at most $10^{5.3}$ (dPa·sec), at least a pair of rolls adjacent to each other in the advancing direction of the glass ribbon has a peripheral speed difference of at least 35 (m/h) therebetween.

In this mode, since among rolls that are disposed in a zone where the edge portions of the glass ribbon in the width direction on the surface of the molten metal bath have a viscosity of at most $10^{5.3}$ (dPa·sec), at least a pair of rolls adjacent to each other in the advancing direction of the glass ribbon has a peripheral speed difference of at least 35 (m/h) therebetween, the glass ribbon can be stretched downstream in the advancing direction to make both edge portions thinner in the zone where the edge portions of the glass ribbon in the width direction on the surface of the molten metal bath have a viscosity of at most $10^{5.3}$ (dPa·sec). Thus, the glass ribbon can be formed so as to be thin in both edge portions and thick in the central portion such that the glass ribbon is provided with a convex shape in section in the width direction.

In another mode of the process for producing sheet glass according to the present invention, it is preferred that the most upstream rolls in the advancing direction of the glass ribbon have a peripheral speed of at most 100 (m/h).

In this mode, when the most upstream rolls in the advancing direction of the glass ribbon have a peripheral speed of at most 100 (m/h), it is possible to increase the width of the glass ribbon spreading toward both sides of the rotary shafts of the most upstream and paired rolls. Thus, the glass ribbon is likely to be formed so as to be thin in both edge portions and thick in the central portion.

In another mode of the process for producing sheet glass according to the present invention, it is preferred that R/S as the ratio of the peripheral speed R of the most upstream rolls in the advancing direction of the glass ribbon to the peripheral speed S of the most downstream rolls in the advancing direction be from 0.01 to 0.32.

In this mode, when R/S as the ratio of the peripheral speed of the most upstream rolls in the advancing direction of the glass ribbon to the peripheral speed of the most downstream rolls in the advancing direction is from 0.01 to 0.32, it is possible to increase the width of the glass ribbon spreading toward both sides of the rotary shafts of the most upstream and paired rolls. Thus, the glass ribbon can be likely to be formed so as to be thin in both edge portions and thick in the central portion.

In another mode of the process for producing sheet glass according to the present invention, it is preferred that the peripheral speed of the most upstream rolls in the advancing direction and the advancing speed of the glass ribbon in an annealing station be controlled so as to satisfy the following formula:

$$\text{(the peripheral speed (m/h) of the most upstream rolls)/(the advancing speed of the glass ribbon in the annealing station)} \leq 0.07 \times \text{(a desired thickness (mm) of the central portion of the glass ribbon in the width direction in the annealing station)}$$

In this mode, when the peripheral speed of the most upstream rolls in the advancing direction and the advancing speed of the glass ribbon in the annealing station are controlled so as to satisfy the following formula, the resulting sheet glass is formed so as to have such a desired thickness in the central portion of the glass ribbon in the width direction in the annealing station and to have a convex shape in section in the width direction:

$$\text{(the peripheral speed (m/h) of the most upstream rolls)/(the advancing speed of the glass ribbon in the annealing station)} \leq 0.07 \times \text{(a desired thickness (mm) of the central portion of the glass ribbon in the width direction in the annealing station)}$$

In another mode of the present invention, it is preferred that the difference between the maximum value and the minimum value in the thickness of the sheet glass produced from the glass ribbon by the process for producing sheet glass according to the present invention be at least 0.1 mm.

In this mode, because the difference between the maximum value and the minimum value in the thickness of the sheet glass is at least 0.1 mm, it is possible to minimize the occurrence of a double image when the sheet glass produced from the glass ribbon by the process for producing sheet glass according to the present invention is used as glass for displaying information.

In another mode of the present invention, it is preferred that the sheet glass produced from the glass ribbon by the process for producing sheet glass according to the present invention have a principal surface with a maximum height Rz of at most 0.3 μm in accordance with JIS B 0601-2001 in a roughness curve having a reference length of 25 mm.

In this mode, when Rz is at most 0.3 μm, a scene seen through the sheet glass can be observed without being distorted. Further, a reflected image is hardly to be distorted when information is displayed on the sheet glass.

In one mode of the sheet glass according to the present invention, the sheet glass is rectangular sheet glass having at least one principal surface formed as a convex surface, wherein the convex surface has two long sides, and a segment passing through the center of gravity of the convex surface and connecting the two long sides at the shortest distance such that intersection points lie at intersections between the two long sides and the segment, wherein when the sheet glass is placed on a horizontal place, a first point is one of the intersection points and lies at a smaller one of the thicknesses of the sheet glass in the vertical direction while a second point lies on the convex surface at a position of the segment that is apart from the first point by ⅖ of the length of the segment, wherein there is a straight line connecting between a point of the convex surface where the thickness of the sheet glass in the vertical direction is maximum between the first point and the second point, and a point on the convex surface where the thicknesses of the sheet glass in the vertical direction is minimum between the first point and the second point, and wherein the straight line forms an angle of from 0.005 deg. to 0.1 deg. to horizontal.

In another mode of the present invention, it is preferred that the sheet glass according to the present invention have a principal surface with a maximum height Rz of at most 0.3 µm in accordance with JIS B 0601-2001 in a roughness curve having a reference length of 25 mm.

In this mode, since the sheet glass has a principal surface with a maximum height Rz of at most 0.3 µm in accordance with JIS B 0601-2001 in a roughness curve having a reference length of 25 mm, a scene seen through the sheet glass can be observed without being distorted. Further, a reflected image is hardly to be distorted when information is displayed on the sheet glass.

In another mode of the sheet glass according to the present invention, it is preferred that the difference between the maximum value and the minimum value in the thickness of the sheet glass be at least 0.1 mm.

In this mode, when laminated glass, which is made of the sheet glass, is used as glass for displaying information, it is possible to minimize the occurrence of a double image since the difference between the maximum value and the minimum value in the thickness of the sheet glass is at least 0.1 mm.

The present invention also provides a process for producing laminated glass, including a step of preparing wedge-shaped glass by cutting the sheet glass produced by the above-mentioned process for producing sheet glass; and a step of laminating and pressing the wedge-shaped glass and other sheet glass with an interlayer being interposed therebetween.

The present invention also provides a process for producing laminated glass, including a step of cutting the sheet glass to prepare wedge-shaped glass; and laminating and pressing the wedge-shaped glass and other sheet glass with an interlayer being interposed therebetween.

In the production of laminated glass according to the present invention, the other sheet glass may be the above-mentioned wedge-shaped glass.

BRIEF DESCRIPTION OF DRAWINGS

FIGS. 6A and 6B illustrate sheet glass produced by the production process according to an embodiment of the present invention, FIGS. 6A and 6B being a plan view and a cross-sectional view, respectively.

DESCRIPTION OF EMBODIMENTS

Now, an embodiment of the present invention will be described.

First, the structure of a glass production apparatus (that is to say, float glass production apparatus) will be explained.

Figure 1A:
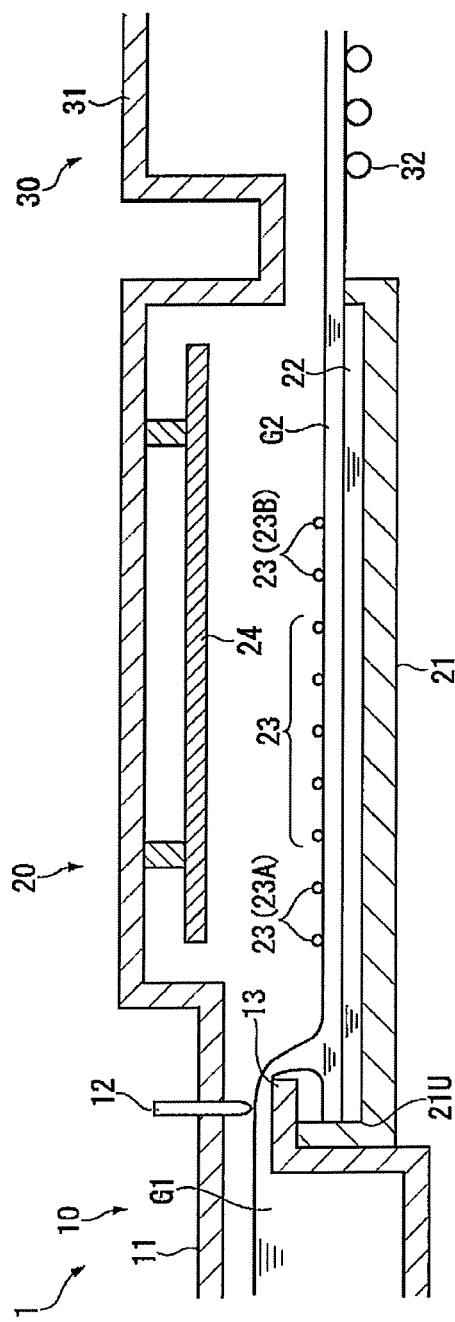
FIGS. 1A and 1B illustrate the glass production apparatus according to an embodiment of the present invention, FIG. 1A and FIG. 1B being a longitudinal cross-sectional view of the apparatus and a transverse cross-sectional view of the apparatus, respectively.
Figure 1B:
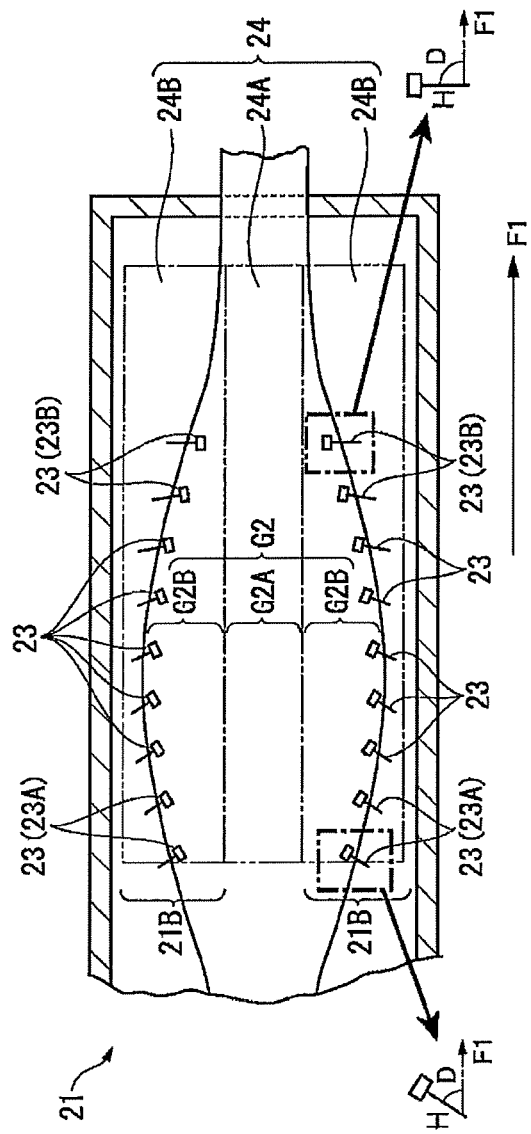

As shown in FIGS. 1A and 1B, the glass production apparatus 1 includes a melting station 10, a forming station 20 and an annealing station 30.

The melting station 10 includes a melting furnace 11, a tweel 12 and a lip 13.

In the melting station 10, the melting furnace 11 melts a glass material into molten glass G1, and the tweel 12 moves vertically with respect to the lip 13 as a flow path for the molten glass G1 to control the amount of the molten glass G1 to be supplied to the forming station 20.

The forming station 20 includes a molten metal bath (that is to say, float bath) 21 and a plurality of rolls 23 and a heater 24.

In the forming station 20, the molten glass G1 successively supplied from the melting station 10 is gradually cooled, being caused to flow in a certain direction, to be formed in a glass ribbon G2. In other words, the molten glass G1 is flown in a glass ribbon form on the molten metal surface of the molten metal bath 21, and the molten glass proceeds in a direction of F1, being floated on the molten metal surface, to be formed into the glass ribbon G2.

The molten metal bath 21 stores molten metal 22, such as tin, and the molten glass G1 is successively supplied on the molten metal 22 via the tweel 12 and the lip 13.

The rolls 23 ride on an upper side of each of both edge portions G2B of the glass ribbon G2. In other words, the plural rolls are brought into contact with both edge portions of the glass ribbon G2. The peripheral speeds of the rolls 23 are controlled in order to adjust the thickness of the glass ribbon G2. The advancing direction F1 means a direction from the melting furnace 11 toward an annealing chamber 31 described later. In the molten metal bath of a usual float glass producing apparatus, the heater 24 is disposed above the molten metal bath 21 and is divided into a central heater 24A for heating a central portion G2A of the glass ribbon G2 in a width direction thereof, and end heaters 24B for heating both edge portions G2B of the glass ribbon G2 in the width direction. The central heater 24A and the edge heaters 24B may be further divided with respect to the advancing direction F1 or the width direction. When these heaters are further divided, the temperature of the glass ribbon G2 is more likely to be controlled. The width direction means a direction orthogonal to the advancing direction F1.

The annealing station 30 includes the annealing chamber 31 and transfer rolls 32.

In the annealing station 30, the glass ribbon G2 formed in the forming station 20 is annealed, being successively transferred by the transfer rolls 32 disposed in the annealing chamber 31. The peripheral speeds of the transfer rolls 32 can be controlled to adjust the advancing speed of the glass ribbon G2 in the forming station 20 and the annealing station 30. Since the rolls 32 ride on the upper side of each of both edge portions G2B of the glass ribbon in the forming station 20, both edge portions G2B are distorted in parts thereof close to the locations where the rolls 23 have ridden on. The glass ribbon G2 is drawn out of the annealing station 30, and edge parts of the glass ribbon G2 distorted by the rolls 23 are cut out and removed by a cutting machine, and the glass ribbon G2 is cut in a certain size by the cutting machine to obtain glass as a product.

Next, the glass produced by the production process according to an embodiment of the present invention (that is to say, float glass production process) will be described.

Figure 2:
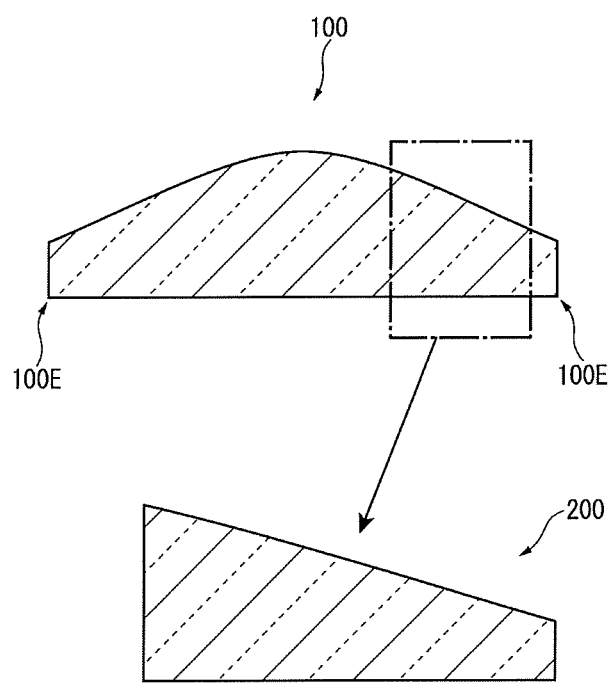
FIG. 2 is a cross-sectional view illustrating glass in a width direction thereof, the glass being produced by the production process according to an embodiment of the present invention.
Figure 3A:
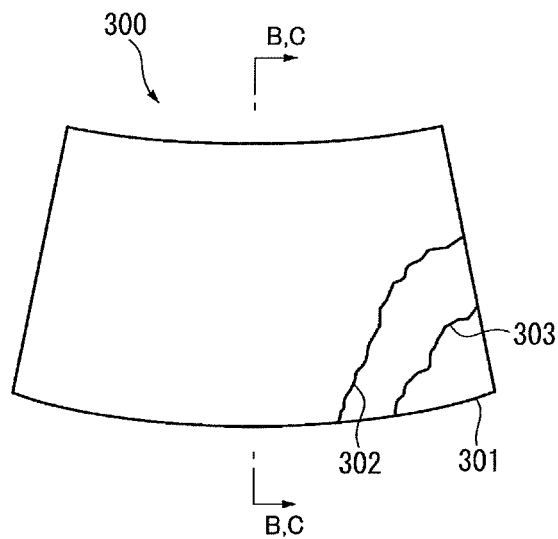
FIGS. 3A, 3B and 3C illustrate a windshield using glass produced by the production process according to the embodiment of the present invention, FIG. 3A being a plan view, and FIGS. 3B and 3C being cross-sectional views.
Figure 3B:
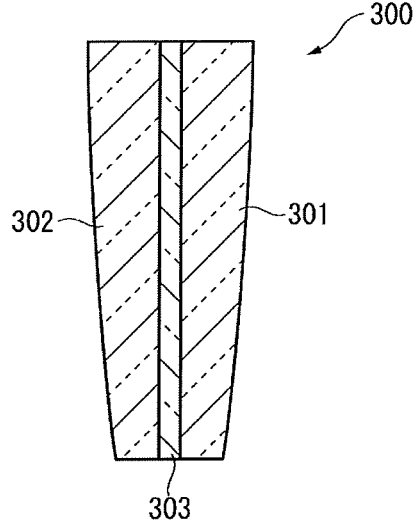
Figure 3C:
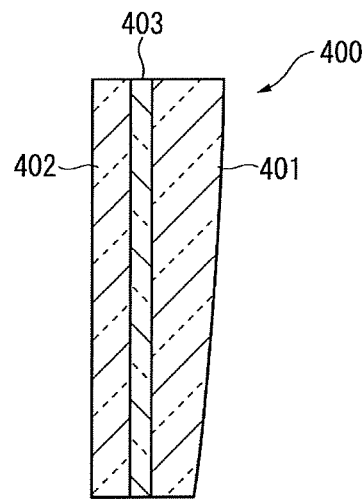

FIG. 2 is a cross-sectional view illustrating glass in a width direction thereof, the glass being produced by the production process according to this embodiment of the present invention. FIG. 3A is a plan view of a windshield using the glass produced by the production process according to the embodiment of the present invention, and FIGS. 3B and 3C are cross-sectional views of windshields using the glass.

The glass produced by the production process according to the embodiment of the present invention is convex shape glass 100, which is thicker toward a central portion of the width direction shown in FIG. 2. The convex shape glass 100 can be cut at a certain position to obtain wedge-shaped glass 200, which has one end portion in the width direction formed so as to be thicker than the other end. The wedge-shaped glass is appropriately used in, e.g. the windshield of an automobile having a HUD as shown in FIGS. 3A, 3B and 3C. The wedge-shaped glass 200 can be used in a windshield such that when the windshield is seen from a driver, the generation of a double image can be minimized without a special interlayer (for example, an interlayer formed in a wedge-shape in section). The glass according to the present invention is applicable to not only the windshield of an automobile but also the window glass of a train, the windshield glass as front portion protection of a motorcyclist, or any kind of glass as long as the glass can display information on it. The glass according to the present invention is not limited to glass of a vehicle for displaying information but may be applicable to glass for displaying various kinds of information. Furthermore, the glass according to the present invention is applicable to various kind of devices utilizing continuous changes in transmission characteristics even in applications other than information display. The windshield 300 shown in FIG. 3B is laminated glass which is produced by sandwiching an interlayer 303 between wedge-shaped glass 301 and wedge-shaped glass 302.

As another mode of the windshield, one of two pieces of glass to be laminated may be glass having a constant thickness. A windshield 400 is laminated glass which is produced by sandwiching an interlayer 403 between wedge-shaped glass 401 and glass 402 having a constant thickness as shown in FIG. 3C.

Now, the process for sheet glass according to one embodiment of the present invention will be described.

When the process for sheet glass according to this embodiment is utilized to produce convex shape glass 100 formed in a convex shape is section in a width direction orthogonal to the advancing direction of a glass ribbon, the glass ribbon G2, which is formed by successively supplying, on the molten metal 22, the molten glass G1 melted in the melting station 10, is heated in an upstream zone of the molten metal bath 21 such that both edge portions G2B of the glass ribbon in the width direction are heated more intensely than the central portion G2A of the glass ribbon in the width direction. The glass ribbon G2 has both edge portions G2B in the width direction heated more intensely than the central portion G2A in the width direction with the result that the viscosity of both edge portions is unlikely to increase in comparison of that of the central portion G2A. Thus, the glass ribbon is likely to be formed so as to be thin in both edge portions G2B and thick in the central portion G2A.

When the above-mentioned usual float glass production apparatus is utilized to produce the convex shape glass according to the present invention, the glass ribbon is heated by preferably utilizing only the edge heaters 24B disposed adjacent to both edge portions in the width direction without substantially using the central heater 24A disposed adjacent to the central portion in the upstream zone. Here, the wording "upstream zone" means a zone of the molten metal bath 21 which is close to the melting furnace 11 and occupies 70% of an upstream area of the molten metal bath. The phrase "without substantially using the central heater 24A" means that the central heater 24A may be heated at an output of at most 1 kw/m$^2$. The viscosity of both edge portions G2B of the glass ribbon in the width direction is unlikely to increase in comparison of that of the central portion G2A by utilizing only the end heaters 24B to conduct heating without substantially utilizing the central heater 24A. Thus, the glass ribbon is likely to be formed so as to be thin in both edge portions G2B and thick in the central portion G2A. The output of the central heater 24A may be 0 kw/m$^2$.

In a "downstream zone" of the molten metal bath 21 that is close to the annealing chamber 31 and occupies 30% of a downstream area of the molten metal bath, the central portion G2A of the glass ribbon may be heated by the central heater 24A.

In another mode of the process for producing sheet glass according to the present invention, the glass ribbon G2 on the surface of the molten metal bath 21 is heated at cooling rate of preferably at most 6.1° C./m in both edge portions G2B. Here, the wording "cooling rate" means an amount of temperature drop that is caused when a glass ribbon advances on a molten metal bath by 1 m in the advancing direction F1. When the cooling rate of both edge portions G2B of the glass ribbon is at most 6.1° C./m, the viscosity of both edge portions is unlikely to increase with the result that the glass ribbon is likely to be formed so as to be thin in both edge portions G2B and thick in the central portion G2A. The cooling rate of both edge portions G2B of the glass ribbon is more preferably at most 6.0° C./m, further preferably at most 5.9° C./m.

On the other hand, both edge portions G2B of the glass ribbon is preferably heated so as to have a cooling rate of at least 3.0° C./m. When the cooling rate is at least 3.0° C./m, the glass ribbon is likely to be sufficiently cooled. The cooling rate of both edge portions G2B of the glass ribbon may be at least 4.0° C./m or at least 5.0° C./m.

The cooling rate of both edge portions G2B of the glass ribbon is preferably slower than that of the central portion G2A of the glass ribbon. When the cooling rate of both edge portions G2B is slower than that of the central portion G2A, the viscosity of both edge portions is unlikely to increase with the result that the glass ribbon is likely to be formed so as to be thin in both edge portions G2B and thick in the central portion G2A.

The cooling rate of both edge portions G2B of the glass ribbon is preferably at least 0.3° C./m slower than that of the central portion G2A of the glass ribbon. When the difference is at least 0.3° C./m, the viscosity of both edge portions is unlikely to increase with the result that the glass ribbon is likely to be formed so as to be thin in both edge portions G2B and thick in the central portion G2A. The cooling rate of both edge portions G2B of the glass ribbon may be at least 0.4° C./m or at least at least 0.5° C./m slower than that of the central portion G2A of the glass ribbon.

The heating temperature of both edge portions G2B of the glass ribbon is preferably controlled such that a location where the edge portions G2B of the glass ribbon on the surface of the molten metal bath 21 have a viscosity of $10^{4.9}$ (dPa·sec) is at least 15 mm apart from a location where the edge portions G2B of the glass ribbon on the surface of the molten metal bath 21 has a viscosity of $10^{6.1}$ (dPa·sec). When the distance between both locations is at least 15 m, the viscosity of both edge portions G2B of the glass ribbon is unlikely to increase with the result that the glass ribbon is likely to be formed so as to be thin in both edge portions and thick in the central portion. The distance is more preferably at least 16 m, further preferably at least 16.5 m.

Further, the heating temperature of both edge portions G2B of the glass ribbon is preferably controlled such that the location where the edge portions G2B of the glass ribbon on the surface of the molten metal bath 21 have a viscosity of $10^{4.9}$ (dPa·sec) is at most 30 m apart from the location where the edge portions G2B of the glass ribbon on the surface of the molten metal bath 21 has a viscosity of $10^{6.1}$ (dPa·sec). When the distance between both locations is at most 30 m, the glass ribbon is likely to be sufficiently cooled. The distance may be at most 25 m or at most 20 m.

The glass ribbon G2 is heated by the heaters with the rolls 23 riding on the upper side of each of both edge portions G2B so as to be formed to have desired width, thickness and shape under the action of the rolls 23. In this process, the respective rolls 23 are controlled so as to be rotated at peripheral speeds such that downstream rolls rotate faster. When the convex shape glass 100 is produced, the rolls 23 are rotated such that upstream rolls 23A in the advancing direction F1 of the glass ribbon G2 have a lower peripheral speed than downstream rolls 23B in the advancing direction. Thus, it is possible to increase the width of the glass ribbon spreading toward both sides of the rotary shafts of the upstream rolls. Consequently, the glass ribbon G2 is likely to be formed so as to be thin in both edge portions and thick in the central portion.

The upstream rolls 23A are rolls close to the melting furnace 11 among the plural rolls 23 disposed along both edge portions of the glass ribbon advancing in the molten metal bath. The upstream rolls may include a single roll disposed on each of both edge portions 21B and closest to the melting furnace 11, two rolls or three rolls disposed on each of both edge portions 21B close to the melting furnace 11. The upstream rolls may include preferably two rolls disposed on each of both edge portions. In particular, the single roll disposed on each of both edge portions 21B and closest to the melting furnace 11 is called the most upstream roll. The downstream rolls 23B may include a single roll disposed on each of both edge portions 21B and closest to the annealing chamber 31 among the rolls or two rolls or three rolls disposed on each of both edge portions 21B and close to the annealing chamber 31. In particular, the single roll disposed on each of both edge portions 21B and closest to the annealing chamber 31 is called the most downstream roll.

The number of the rolls 23 is preferably 7 to 15 on each of both edge portions 21B. When the number of the rolls is from 7 to 15, it is easy to control the glass ribbon G2 so as to have a certain thickness. The number of the rolls 23 is more preferably from 8 to 13 on each of both edge portions.

In zones where the edge portions G2B of the glass ribbon on the surface of the molten metal bath have a viscosity of at most $10^{5.3}$ (dPa·sec) (hereinbelow, referred to as low viscosity zones), the number of the rolls riding on each of both edge portions G2B of the glass ribbon may be at most 8, at most 7, at most 6, at most 5 or at most 3.

In zones where the edge portions G2B of the glass ribbon on the surface of the molten metal bath have a viscosity of higher than $10^{5.3}$ (dPa·sec) (hereinbelow, referred to as high viscosity zones), the number of the rolls riding on each of both edge portions G2B of the glass ribbon may be at most 10, at most 8, at most 6, at most 4, at most 2 or at most 1.

The upstream rolls 23A may be disposed in the low viscosity zones while the downstream rolls 23B may be disposed in the high viscosity zones.

With regard to the rolls disposed in the zones where the edge portions of the glass ribbon in the width direction on the surface of the molten metal bath have a viscosity of at most $10^{5.3}$ (dPa·sec) (low viscosity zones), at least a pair of rolls adjacent to each other in the advancing direction of the glass ribbon has a peripheral speed difference of at least 35 (m/h) therebetween. When the paired rolls have a peripheral speed difference of at least 35 (m/h) therebetween, the glass ribbon can be stretched downstream in the advancing direction of the glass ribbon to make both edge portions thin in the zones where the edge portions of the glass ribbon have a viscosity of at most $10^{5.3}$ (dPa·sec). Thus, the glass ribbon can be formed so as to be thin in both edge portions and thick in the central portion such that the glass ribbon is provided with a convex shape. In the zones where the edge portions of the glass ribbon in the width direction on the surface of the molten metal bath have a viscosity of at most $10^{5.3}$ (dPa·sec), the paired rolls adjacent to each other in the advancing direction of the glass ribbon may have a peripheral speed difference of at least 40 (m/h), at least 45 (m/h) or at least 50 (m/h) therebetween.

With regard to the rolls disposed in the zones where the edge portions of the glass ribbon in the width direction on the surface of the molten metal bath have a viscosity of at most $10^{5.3}$ (dPa·sec) (low viscosity zones), at least a pair of rolls adjacent to each other in the advancing direction of the glass ribbon has a peripheral speed difference of at most 100 (m/h) therebetween. When the paired rolls have a peripheral speed difference of at most 100 (m/h) therebetween, it is easy to control the thickness of the glass ribbon. The peripheral speed difference may be at most 80 (m/h) or at most 60 (m/h).

The most upstream rolls have a peripheral speed of preferably at most 100 (m/h). When the peripheral speed is at most 100 (m/h), it is possible to increase the width of the glass ribbon spreading toward both sides of the rotary shafts of the most upstream and paired rolls. Thus, the glass ribbon is likely to be formed so as to be thin in both edge portions G2B and thick in the central portion G2A. The most upstream rolls may have a peripheral speed of at most 90 (m/h), at most 80 (m/h), at most 70 (m/h) or at most 60 (m/h).

Further, the most upstream rolls have a peripheral speed of preferably at least 30 (m/h). When the peripheral speed is at least 30 (m/h), it is easy to control the thickness of the glass ribbon. The most upstream rolls may have a peripheral speed of at least 40 (m/h), or at least 50 (m/h).

R/S as the ratio of the peripheral speed R of the most upstream rolls to the peripheral speed S of the most downstream rolls is preferably from 0.01 to 0.32. When R/S is from 0.01 to 0.32, it is possible to increase the width of the glass ribbon spreading toward both sides of the rotary shafts of the most upstream and paired rolls. Thus, the glass ribbon is likely to be formed so as to be thin in both edge portions G2B and thick in the central portion G2A. R/S is more preferably at least 0.1, furthermore preferably at least 0.14, particularly preferably at least 0.16. On the other hand, R/S is more preferably at most 0.3, furthermore preferably at most 0.25, particularly preferably at most 0.23.

In order to form the glass ribbon G2 in a desired thickness, the peripheral speed (m/h) of the most upstream rolls and the advancing speed (m/h) of the glass ribbon in the annealing station are preferably controlled so as to satisfy the following formula:

(the peripheral speed (m/h) of the most upstream rolls)/(the advancing speed of the glass ribbon in the annealing station)≤0.07×$t$    formula (1)

In the formula, t is a desired thickness (unit: mm) of the central portion of the glass ribbon in the width direction in the annealing station. When formula (1) is satisfied, it is possible to form sheet glass so as to have such a desired thickness in the central portion of the glass ribbon in the width direction in the annealing station and to have a convex shape in section in the width direction.

In order to control the thickness of the glass ribbon G2, adjustment may be made to an angle D formed between the advancing direction F1 of the glass ribbon G2 and the rotational axis direction of the rolls H (see the angle D indicated by an arrow in FIG. 1B). When the angle D of each of the most upstream rolls being adjusted to be from 75 deg. to 85 deg. with the angle D of each of the most downstream rolls being adjusted to be from 90 deg. to 105 deg., the thickness of both end portions G2B of the glass ribbon G2 in the width direction is likely to be thinned. The angle D of each of the most upstream rolls is preferably from 81 deg. to 84 deg., more preferably from 82 deg. to 83 deg. The angle D of each of the most downstream rolls is preferably from 95 deg. to 103 deg., more preferably from 98 to 101 deg.

The advancing speed of the glass ribbon can be adjusted in the forming station 20 or the annealing station 30 to make it easy to spread the glass ribbon G2 in the width direction in an upstream zone of the molten metal bath 21 such that the glass ribbon G2 is formed so as to be thin in both edge portions G2B in the width direction.

The advancing speed of the glass ribbon may be from 200 to 1,500 (m/h) in the forming station 20 or the annealing station 30. When the advancing speed of the glass ribbon G2 is set at from 200 to 1,500 (m/h) in the forming station 20 or the annealing station 30, it becomes easy to spread the glass ribbon G2 in the width direction in the upstream zone of the molten metal bath 21 such that the glass ribbon G2 is likely to be thin in both edge portions G2B in the width direction. The advancing speed of the glass ribbon G2 may be at least 500 (m/h), at least 600 (m/h) or at least 700 (m/h). On the other hand, the advancing speed of the glass ribbon G2 may be at most 1,300 (m/h), at most 1,100 (m/h) or at most 900 (m/h).

The difference between the maximum value and the minimum value in the thickness of the sheet glass produced by the production process according to an embodiment of the present invention is preferably at least 0.1 mm. When the difference is at least 0.1 mm, it is possible to minimize the occurrence of a double image when a sheet glass is used as glass for displaying information even in a case where the sheet glass is mounted as the windshield to a vehicle where the windshield has a great mounting angle to horizontal. Here, the difference between the maximum value and the minimum value in the thickness of the sheet glass means the difference between the maximum value and the minimum value of the thickness of a convex shape glass 100 which is produced by utilizing a cutting machine to cut both longitudinal edges of the glass ribbon G2 where distortion is caused by the rolls 23. The difference between the maximum value and the minimum value in the thickness of the sheet glass may be at least 0.2 mm, at least 0.3 mm, at least 0.4 mm or at least 0.5 mm. On the other hand, the difference between the maximum value and the minimum value in thickness of the sheet glass may be at most 1.5 mm. When the difference is at most 1.5 mm, it is possible to minimize the occurrence of a double image when the sheet glass is used as glass for displaying information even in a case where the sheet glass is mounted, as a windshield, to the vehicle where the windshield has a small mounting angle to horizontal. The difference between the maximum value and the minimum value in the thickness of the sheet glass may be at most 1.3 mm, at most 1.2 mm or at most 1.1 mm, or at most 1.0 mm. When the sheet glass is used as, e.g. the windshield of an automobile, the optimum difference between the maximum value and the minimum value in the thickness of the sheet glass may be selected according to the mounting angle of the windshield, and the mounting angle and the position of a projector for displaying information.

The sheet glass produced by the production process according to this embodiment has preferably a principal surface with a maximum height Rz of at most 0.3 μm in accordance with JIS B 0601-2001 in a roughness curve having a reference length of 25 mm. When the principal surface has Rz of at most 0.3 μm, a scene seen through the glass can be observed without being distorted in e.g. a case where the sheet glass is used as glass for displaying information. Further, a reflective image is hardly to be distorted when information is displayed on the sheet glass. Here, the roughness curve is represented by a wave form. Rz is more preferably at most 0.25 μm, furthermore preferably at most 0.2 μm, particularly preferably at most 0.18 μm, most preferably at most 0.16 μm. Rz of the principal surface of sheet glass can be decreased by increasing the advancing speed of the glass ribbon G2 in the annealing station. Here, the principal surface of sheet glass means a surface of the glass ribbon G2 in contact with the molten metal in the molten metal bath (hereinbelow, referred to as the surface in contact with the molten metal), and a surface of a glass ribbon opposed to the surface in contact with the molten metal and out the molten metal 22 (hereinbelow, referred to as the surface out of contact with the molten metal).

The sheet glass produced by the production process according to this embodiment of the present invention has a principal surface with the maximum height Rz in accordance with JIS B 0601-2001 being preferably at most 80% of sheet glass having a constant thickness in a roughness curve having a reference length of 25 mm. When Rz of the principal surface of the sheet glass is at most 80% of sheet glass having a constant thickness, a scene seen through the sheet glass can be observed without being distorted. Further, a reflected image is hardly to be distorted when information is displayed on the sheet glass. Rz is preferably at most 70%, more preferably 60% of sheet glass having a constant thickness.

Laminated glass is produced based on the sheet glass produced by the above-mentioned process for producing sheet glass.

The process for producing laminated glass according to an embodiment of the present invention will be described in reference to FIG. 2 and FIGS. 3A, 3B and 3C. The process for producing laminated glass to be applied to the windshield of a vehicle will be described as an example.

The process for producing laminated glass according to this embodiment of the present invention includes:

a step of preparing wedge-shaped glass 200 by cutting convex shape and sheet glass 100 produced by the above-mentioned process for producing sheet glass: and a step of laminating and pressing the wedge-shaped glass 200 and other sheet glass with an interlayer being interposed therebetween.

First, the convex shape glass 100 is prepared so as to be gradually thicker toward a central portion thereof in the width direction by the above-mentioned sheet glass production process. The convex shape glass 100 is cut at certain positions to prepare the wedge-shaped glass 200 so as to be thicker at one end than the other end in the width direction. Although there is no limitation to the cutting method, the wedge-shaped glass 200 may be produced by, e.g. using a cutter to form a scribe line in a desired window glass shape on the convex shape glass 100 and cutting out the convex shape glass 100 by breaking along the scribe line. The wedge-shaped glass 200 has a peripheral edge chamfered.

Subsequently, the wedge-shaped glass 200 and the other sheet glass are paired to form paired sheet glass, and the paired sheet glass is bent by, e.g. gravity bend, with the wedge-shaped glass and the other sheet glass being superposed through a mold leasing agent therebetween. The paired sheet glass is heated in a furnace, bent in a soften state and annealed. The bending method is not limited to gravity bend. The paired sheet glass may be bent by a press, or the wedge-shaped glass and the other sheet glass may be bent independently without being superposed.

Next, the wedge-shaped glass 200 and the other sheet glass are laminated and pressed through the interlayer to produce laminated glass. The other sheet glass may be wedge-shaped glass 200 or sheet glass having a constant thickness. Sheet glass having a constant thickness is produced by a known method and is cut out by the above-mentioned cutting method. When laminated glass 300 using the wedge-shaped glass 200 as the other sheet glass is mounted on a vehicle having the windshield positioned at a large mounting angle to horizontal, a reflected image is hardly to be distorted when displaying information on the laminated glass. When laminated glass 400 uses, as the other sheet glass, sheet glass having a constant thickness, a scene seen through a windshield can be observed without being distorted. The interlayer may be made of polyvinyl butyral for example.

When pressing is carried out, the air between the paired sheet glass and the interlayer is first evacuated, following heating the paired sheet glass and the interlayer to bond the paired sheet glass and the interlayer. Evacuation may be carried out by placing a laminate of the paired sheet glass and the interlayer in a rubber bag and heating the laminate under decompression for example. Evacuation may be carried out by the nipper roll method or the rubber channel method. Finally, the laminate of the paired sheet glass and the interlayer is subjected to pressure treatment in an autoclave such that the paired sheet glass and the interlayer are heated to be bonded together.

Now, the sheet glass according to one embodiment of the present invention will be described.

FIGS. 6A and 6B illustrate the sheet glass according to this embodiment of the present invention, FIGS. 6A and 6B being a plan view and a cross-sectional view, respectively.

The sheet glass according to this embodiment includes rectangular sheet glass 500 having at least one principal surface formed as a convex surface 507, wherein the convex surface 507 has two long sides 501 and 502, and a segment 503 passing through the center of gravity of the convex surface and connecting the two long sides 501 and 502 at the shortest distance such that there are intersections 504, 505 between the two long sides and the segment, wherein when the sheet glass 500 is placed on a horizontal place, a first point 504 is one of the intersections 504, 505 having a smaller thicknesses of the sheet glass in the vertical direction while a second point 506 lies on the convex surface 507 at a position of the segment 503 that is apart from the first point 504 by ⅔ of the length of the segment 503, wherein there is a straight line H connecting between a point of the convex surface 507 where the thickness of the sheet glass in the vertical direction is maximum between the first point 504 and the second point 506, and a point on the convex surface 507 where the thicknesses of the sheet glass in the vertical direction is minimum between the first point 504 and the second point 506, and wherein the straight line H forms an angle α of from 0.005 deg. to 0.1 deg. to horizontal.

The sheet glass 500 according to this embodiment of the present invention may be obtained by, e.g. cutting sheet glass produced by the above-mentioned process for producing sheet glass. Although there is no limitation to the cutting method, the sheet glass 500 according to this embodiment of the present invention is produced by using a cutter to form a scribe line in the shape of a desired window glass on the sheet glass and breaking the sheet glass.

When the sheet glass 500 according to this embodiment of the present invention is applied to the windshield of a vehicle, the sheet glass 500 is mounted to the vehicle such that the long side 502 with the minimum thickness is located at a lower position to display information on a portion of the windshield with a small thickness for example.

The sheet glass 500 according to this embodiment of the present invention is characterized to have at least one principal surface formed as the convex surface 507. Because the principal surface is formed as the convex surface 507, a reflected image is hardly to be distorted when information is displayed on the sheet glass. In comparison with a case where the principal surface is formed as a concave surface, an upper portion of the windshield with no information displayed thereon has a reduced thickness to decrease the weight of the windshield, improving the fuel consumption of the vehicle. The location where information is displayed on the windshield is not limited to a lower position, but may be at an upper position, a left or right position or a central position. The sheet glass is mounted such that the location where information is displayed has a thin thickness. Wherever the location where information is displayed is, it is possible to decrease the thickness of a portion with no information displayed thereon to reduce the weight of the windshield in comparison with a case having a concave surface as the principal surface, as long as the principal surface is a convex surface.

The sheet glass 500 according to this embodiment of the present invention is characterized to be rectangular. When the sheet glass 500 is rectangular, it is easy to handle the sheet glass during transportation or the like. Here, the wording "rectangular" is not limited to precisely rectangular but may be a case where a side is curved. The angle of each corner is not limited to 90 deg. but may be from 80 deg. to 100 deg.

The sheet glass 500 according to this embodiment of the present invention may have a cutout formed in one side and have a corner formed in an arc shape.

The sheet glass according to this embodiment is characterized in that the convex surface 507 has the two long sides 501 and 502, and the segment 503 passing through the center of gravity of the convex surface 507 and connecting the two long sides 501 and 502 at the shortest distance such that the first point 504 and the intersection 505 lie at intersections between the two long sides and the segment, that when the sheet glass 500 is placed on a horizontal place, the first point 504 lies at a smaller one of the thickness of the sheet glass in the vertical direction while the second point 506 lies on the convex surface 507 at a position of the segment 503 that is apart from the first point 504 by ⅖ of the length of the segment 503, that there is a straight line H connecting between a point of the convex surface 507 where the thickness of the sheet glass in the vertical direction is maximum between the first point 504 and the second point 506, and a point on the convex surface 507 where the thickness of the sheet glass in the vertical direction is minimum between the first point 504 and the second point 506, and wherein the straight line H forms an angle α of from 0.005 deg. to 0.1 deg. to horizontal. The thickness of the sheet glass may be measured by, e.g. a laser displacement gauge, a microgauge or an ultrasonic thickness gauge. The angle α may be calculated based on a measured thickness.

When the windshield is mounted to a vehicle where the windshield has a small mounting angle to horizontal, the angle α of the sheet glass is preferably small because a reflected image is hardly to be distorted when information is displayed on the sheet glass. On the other hand, when the windshield is mounted to a vehicle where the windshield has a large mounting angle to horizontal, the angle α of the sheet glass is preferably large because a reflected image is hardly to be distorted when information is displayed on the sheet glass.

When the sheet glass according to this embodiment of the present invention is set at a mounting angle of at least 0.005 deg., a reflected image is hardly to be distorted when the sheet glass is mounted as the windshield of a vehicle where the windshield has a large mounting angle to horizontal, and when information is displayed on the sheet glass. The angle α may be at least 0.01 deg., at least 0.02 deg., at least 0.03 deg., at least 0.035 deg. or at least 0.04 deg. Further, in a case where the angle α is set at at most 0.1 deg., a reflected image is hardly to be distorted even when the sheet glass is mounted as the windshield of a vehicle where the windshield has a small mounting angle to horizontal, and information is displayed on the sheet glass. The angle α may be at most 0.08 deg., at most 0.07 deg. or at most 0.06 deg. The optimum angle α may be selected according to the mounting angle of the windshield, and the mounting angle and the position of a projector for displaying information.

The sheet glass 500 according to this embodiment of the present invention is preferred to be configured so as to have a principal surface with a maximum height Rz of at most 0.3 μm in accordance with JIS B 0601-2001 in a roughness curve having a reference length of 25 mm. Because Rz is at most 0.3 μm, a scene seen through the sheet glass can be observed without being distorted. Further, a reflected image is hardly to be distorted when information is displayed on the sheet glass.

The sheet glass 500 according to one embodiment of the present invention, the difference between the maximum value and the minimum value in the thickness of the sheet glass is preferably at least 0.1 mm. Because the difference between the maximum value and the minimum value in the thickness of the sheet glass is preferably at least 0.1 mm, it is possible to minimize the occurrence of a double image when the sheet glass is mounted as the windshield of a vehicle where the windshield has a large mounting angle to horizontal, and when information is displayed on the sheet glass. On the other hand, the difference between the maximum value and the minimum value in the thickness of the sheet glass may be at most 1.5 mm. When the difference is at most 1.5 mm, it is possible to minimize the occurrence of a double image when the sheet glass is mounted as the windshield of a vehicle where the windshield has a small mounting angle to horizontal, and when the sheet glass is used as glass for displaying information. The difference between the maximum value and the minimum value in the thickness of the sheet glass may be at most 1.3 mm, at most 1.2 mm, at most 1.1 mm or at most 1.0 mm.

The sheet glass 500 according to this embodiment of the present invention has short sides 508 and 509 extending by a length of at least preferably 600 mm. When the length of each short side is at least 600 mm, the sheet glass is applicable to a large-size vehicle. Further, the sheet glass is mountable to a vehicle where the windshield has a small mountable angle to horizontal. Each of the short sides of the sheet glass may have a length at least 800 mm, at least 1,000 mm, at least 1,200 mm or at least 1,400 mm.

The sheet glass 500 can be utilized to produce laminated glass.

The process for producing laminated glass according to one embodiment of the present invention includes:

a step of preparing wedge-shaped glass by cutting the sheet glass 500; and a step of laminating and pressing the wedge-shaped glass and other sheet glass with an interlayer being interposed therebetween.

First, the sheet glass 500 is cut out at certain positions to prepare the wedge-shaped glass 200 which is thicker at one end than the other end in the width direction. After that, laminated glass is produced by dealing with the wedge-shaped glass in the same way as the process for producing laminated glass using sheet glass produced by the above-mentioned sheet glass production process.

As described above, in the above-mentioned embodiment, the glass ribbon has both edge portions G2B in the width direction heated more intensely than the central portion G2A in the width direction in the upstream zone of the molten metal bath 21, and the plural rolls 23 are rotated such that the upstream rolls 23A in the advancing direction F1 have a lower peripheral speed than the downstream rolls 23B in the advancing direction. Thus, the viscosity of both edge portions G2B is unlikely to increase in comparison of that of the central portion G2A, and it is possible to increase the width of the glass ribbon spreading toward both sides of the rotary shafts of the upstream rolls such that it become easy to spread the glass ribbon G2 in the width direction in the upstream zone of the molten metal bath 21. Accordingly, the glass ribbon G2 can be formed so as to be thin in both edge portions G2B in the width direction and thick in the central portion G2A.

EXAMPLES

Now, examples of the present invention will be described. Example 1 is a Comparative Example while Examples 2 to 9 are Examples of the present invention.

Figure 4:
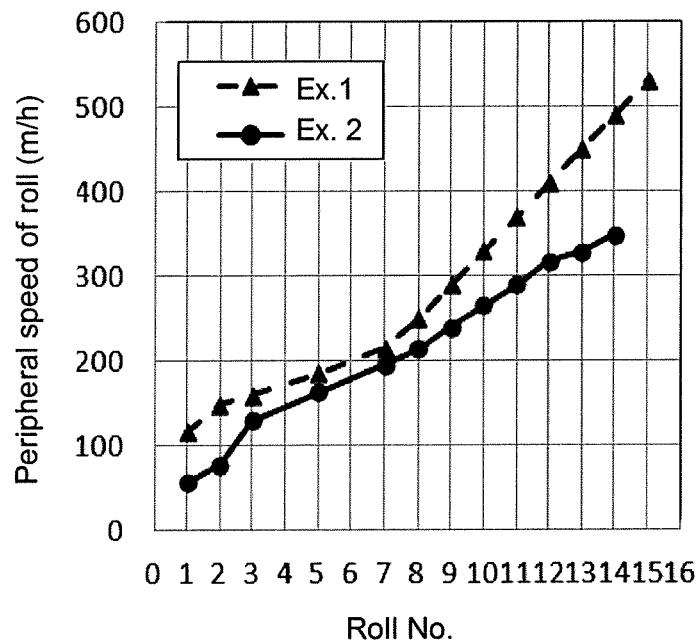
FIG. 4 is a graph illustrating the peripheral speeds of rolls in Examples 1 and 2 of the present invention.
Figure 5:
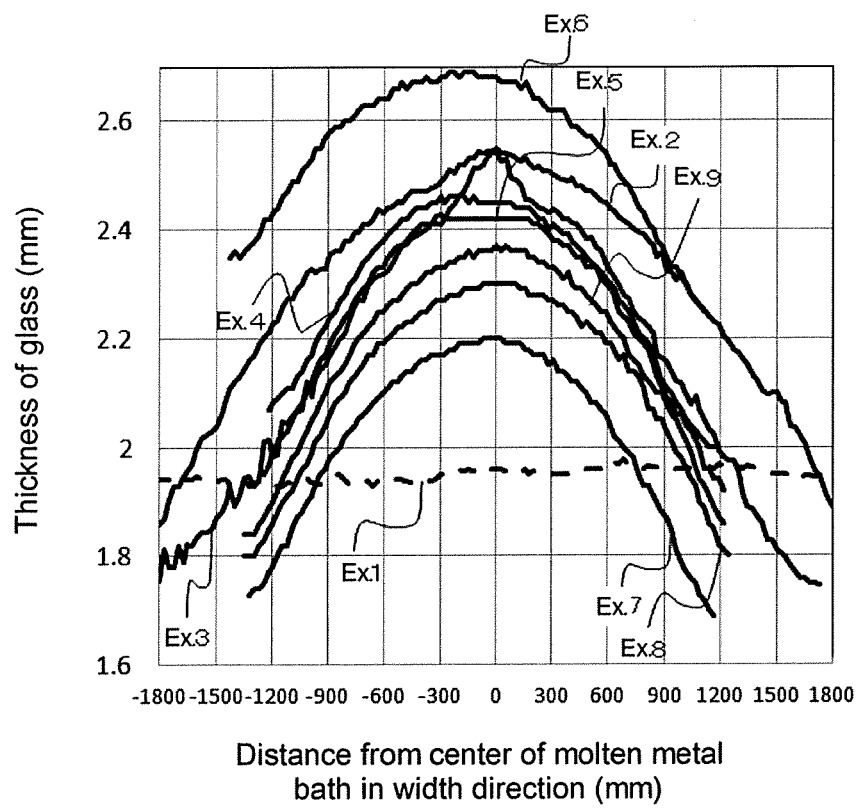
FIG. 5 is a graph illustrating the thickness of each glass produced by Examples 1 to 9 of the present invention.

FIG. 4 is a graph showing the positions of the respective rolls and the peripheral speeds of the respective rolls in Examples 1 and 2. The horizontal axis shows roll numbers, and roll number 1 indicates the most upstream rolls. Rolls having a larger number mean rolls disposed more downstream in the advancing direction F1 of the glass ribbon. Roll numbers 1 to 7 show rolls in a low viscosity zone while rolls numbers 8 to 15 show rolls in a high viscosity zone. FIG. 5 shows the thicknesses of the sheet glass produced in Examples 1 to 9 (unit: mm) with respect to distances apart from the center of molten glass bath in a width direction (unit: mm). In FIG. 5, the thickness of glass means the thickness of respective parts of glass after edge areas of the glass ribbons were cut.

Example 1

In order to produce sheet glass having a constant thickness, an apparatus similar to the glass production apparatus shown in FIGS. 1A and 1B was employed to heat a glass ribbon G2 by a central heater 24A and edge heaters 24B. The outputs from the central heater 24A and the edge heaters 24B were controlled such that the glass ribbon had a temperature of 955° C. at the center in a width direction thereof and a temperature of 934° C. in both edge portions at a location of 8.6 m apart from an upstream end 21U in an advancing direction F1 of a molten metal bath 21, and that the glass ribbon had a temperature of 811° C. at the center in the width direction and a temperature of 830° C. in both edge portions at a location of 25.4 m apart from the upstream end in the advancing direction. It should be noted that the edge portions lie at locations apart from the edges of the glass ribbon toward the center of the glass ribbon by 500 mm. The glass ribbon was set to have a cooling rate of 8.59° C./m at the center in the width direction and a cooling rate of 6.20° C./m at each of the edge portions between a location apart from the upstream end by 8.6 m and a location apart from the upstream end by 25.4 m. The distance between a location where the glass ribbon had a viscosity of $10^{4.9}$ (dPa·sec) at the edge portions G2B and a location where the glass ribbon had a viscosity of $10^{6.1}$ (dPa·sec) at the edge portions was 16.8 m. The viscosity of the edge portions G2B of the glass ribbon was calculated based on the temperature of the edge portions G2B of the glass ribbon.

Thirteen rolls 23 were disposed on each of both edge portions of the molten metal bath 21, and the respective rolls were controlled to have peripheral speeds shown as FIG. 4 and Table 1. In Table 1, roll number 1 indicates the most upstream rolls, and rolls having a larger roll number mean rolls closer to an annealing chamber 31. In Table 1, blank columns mean that rolls were not disposed. In this Comparative Example, the most upstream rolls had a peripheral speed of 116 (m/h), the most downstream rolls had a peripheral speed of 531 (m/h), R/S as the ratio of the peripheral speed R of the most upstream rolls to the peripheral speed S of the most downstream rolls was 0.218, and the glass ribbon G2 had an advancing speed of 719 m/h in an annealing station. A pair of adjacent rolls in the low viscosity zone had a peripheral speed difference of 32 (m/h) at the maximum.

The sheet glass produced under the above-mentioned conditions had a constant thickness in a width direction thereof as shown in FIG. 5. When findings were made about the maximum height Rz of the sheet glass in accordance with JIS B 0601-2001 in a roughness curve having a reference length of 25 mm with respect to each of a surface in contact with molten metal and a surface out of contact with the molten glass, the values shown in Table 2 were given. The above-mentioned angle α of the sheet glass that was obtained by cutting the sheet glass at a location apart from an edge in the width direction by 1 m was 0.0011 deg. Although an attempt was made to a convex glass ribbon having a thickness of 2.5 mm at the center in the width direction in the annealing station, formula (1) was not satisfied, which showed that no convex glass ribbon was produced.

Example 2

In order to produce convex glass unlike the above-mentioned Example, the same apparatus as Example 1 was employed so as to heat both edge portions of the glass ribbon by the edge heaters 24B in the upstream zone without using the central heaters 24A. The outputs from the central heater 24A and the edge heaters 24B were controlled such that the glass ribbon had a temperature of 929° C. at the center in a width direction thereof and a temperature of 929° C. in both edge portions at a location of 8.6 m apart from the upstream end 21U in the advancing direction F1 of the molten metal bath 21, and that the glass ribbon had a temperature of 819° C. at the center in the width direction thereof and a temperature of 829° C. in both edge portions at a location of 25.4 m apart from the upstream end in the advancing direction. It should be noted that the edge portions lie at locations apart from the edges of the glass ribbon toward the center of the glass ribbon by 500 mm. The glass ribbon was set to have a cooling rate of 6.56° C./m at the center in the width direction and a cooling rate of 5.97° C./m at each of the edge portions between a location apart from the upstream end by 8.6 m and a location apart from the upstream end by 25.4 m. The distance between a location where the glass ribbon had a viscosity of $10^{4.9}$ (dPa·sec) at the edge portions G2B and a location where the glass ribbon had a viscosity of $10^{6.1}$ (dPa·sec) at the edge portions was 16.8 m.

Twelve rolls 23 were disposed on each of both edge portions of the molten metal bath 21, and the respective rolls 23 were controlled to have peripheral speeds as shown in FIG. 4 and Table 1. In this Example, the most upstream rolls had a peripheral speed of 56 (m/h), the most downstream rolls had a peripheral speed of 348 (m/h), R/S as the ratio of the peripheral speed R of the most upstream rolls to the peripheral speed S of the most downstream rolls was 0.161, and the glass ribbon G2 had an advancing speed of 580 m/h in the annealing station. The rolls indicated by roll numbers 2 and 3 had a peripheral speed difference of 53 (m/h) in a low viscosity zone.

The sheet glass produced under the above-mentioned conditions had a thickness made so as to be thinner in both edge portions in a width direction thereof and thicker in a central portion than the sheet glass having a constant thickness (Example 1) as shown in FIG. 5. Accordingly, the sheet glass was convex in section in the width direction. The sheet glass had a maximum value of 2.55 (mm) and a minimum value of 1.85 (mm) in thickness. When findings were made about the maximum height Rz of the sheet glass in accordance with JIS B 0601-2001 in a roughness curve having a reference length of 25 mm with respect to each of a surface in contact with molten metal and a surface out of contact with the molten glass, the values shown in Table 2 were given. The above-mentioned angle α of the sheet glass that was obtained by cutting the sheet glass at a location apart from an edge in the width direction by 1 m was 0.0336 deg. The glass ribbon had a thickness of 2.55 mm in the center in the width direction in the annealing station, which showed that formula (1) was satisfied.

Examples 3 to 9

In order to produce convex glass as in Example 2, the operation in each of these Examples was carried out to heat both edge portions of the glass ribbon by the edge heaters 24B in the upstream zone without using the central heaters 24A.

In the respective Examples, eight to eleven rolls 23 were disposed on each of both edge portions of the molten metal bath 21, and the respective rolls 23 were controlled to have peripheral speeds as shown in Table 1. The unit of the values shown in Table 1 is (m/h). In each of these Examples, the advancing speed V (m/h) of the glass ribbon G2 in the annealing station, the peripheral speed R (m/h) of the most upstream rolls, the peripheral speed S (m/h) of the most downstream rolls, R/S as the ratio of the peripheral speed R of the most upstream rolls to the peripheral speed S of the most downstream rolls, and the maximum peripheral speed difference (m/h) of a pair of adjacent rolls in the low viscosity zone are shown in Table 2.

In each of these examples, the sheet glass produced under the above-mentioned conditions had a thickness made so as to be thinner in both edge portions in a width direction thereof and thicker in a central portion than the sheet glass having a constant thickness (Example 1) as shown in FIG. 5. Accordingly, the sheet glass in each of these examples was convex in section in the width direction. When in each of these Examples, findings were made about the maximum value T (mm), the minimum value M (mm) and the difference between the maximum value and the minimum value (T-M) in the thickness of the sheet glass, and the maximum height Rz of the sheet glass in accordance with JIS B 0601-2001 in a roughness curve having a reference length of 25 mm with respect to each of a surface in contact with the molten metal and a surface out of contact with the molten glass, the values shown in Table 2 were given. In each of these examples, the angle α of the sheet glass that was obtained by cutting the sheet glass at a location apart from an edge in the width direction by 1 m was found to have values as shown in Table 2. In each of these examples, the glass ribbon had a value in thickness shown in Table 2 in the center in the width direction in the annealing station, which showed that formula (1) was satisfied.

TABLE 1

|  | Roll No. | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- | --- |
| Low viscosity zone | 1 | 116 | 56 | 51 | 98 | 98 | 83 | 80 | 75 | 75 |
|  | 2 | 148 | 77 | 105 | 105 | 105 | 96 | 90 | 80 | 80 |
|  | 3 | 160 | 130 | 136 | 115 | 115 | 105 | 100 | 85 | 85 |
|  | 4 |  |  |  | 125 | 125 | 120 | 120 | 95 | 95 |
|  | 5 | 185 | 163 | 153 | 155 | 155 | 150 | 145 | 115 | 115 |
|  | 6 |  |  |  | 175 | 175 | 170 | 170 | 145 | 145 |
|  | 7 | 215 | 195 | 185 | 200 | 200 | 195 | 195 | 170 | 170 |
| High viscosity zone | 8 | 250 | 214 | 205 | 325 | 325 | 338 | 340 | 195 | 195 |
|  | 9 | 290 | 240 | 230 |  |  |  | 550 | 340 | 340 |
|  | 10 | 330 | 265 | 253 |  |  |  |  |  |  |
|  | 11 | 370 | 290 | 274 |  |  |  |  |  |  |
|  | 12 | 410 | 317 | 291 |  |  |  |  |  |  |
|  | 13 | 451 | 328 | 302 |  |  |  |  |  |  |
|  | 14 | 490 | 348 |  |  |  |  |  |  |  |
|  | 15 | 531 |  |  |  |  |  |  |  |  |

TABLE 2

|  | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- |
| Advancing speed V (m/h) of glass ribbon G2 in annealing station | 719 | 580 | 585 | 820 | 865 | 643 | 840 | 750 | 750 |
| Peripheral speed R (m/h) of the most upstream rolls | 116 | 56 | 51 | 98 | 98 | 83 | 80 | 75 | 75 |
| Peripheral speed S (m/h) of the most downstream rolls | 531 | 348 | 302 | 325 | 325 | 338 | 550 | 340 | 340 |
| R/S | 0.218 | 0.161 | 0.169 | 0.302 | 0.302 | 0.246 | 0.145 | 0.221 | 0.221 |
| Maximum value (m/h) in peripheral speed difference between paired adjacent rolls in low viscosity zone | 32 | 53 | 54 | 30 | 30 | 30 | 25 | 30 | 30 |
| Maximum value T (mm) in thickness of sheet glass | 1.97 | 2.55 | 2.54 | 2.46 | 2.42 | 2.69 | 2.20 | 2.30 | 2.37 |
| Minimum value M (mm) in thickness of sheet glass | 1.93 | 1.85 | 1.75 | 2.00 | 1.92 | 2.25 | 1.69 | 1.80 | 1.86 |
| Thickness t (mm) at center of glass ribbon | 1.96 | 2.55 | 2.54 | 2.45 | 2.42 | 2.68 | 2.20 | 2.30 | 2.37 |
| R/V | 0.16 | 0.10 | 0.09 | 0.12 | 0.11 | 0.13 | 0.10 | 0.10 | 0.10 |
| 0.07 × t | 0.14 | 0.18 | 0.18 | 0.17 | 0.17 | 0.19 | 0.15 | 0.16 | 0.17 |
| T − M | 0.04 | 0.70 | 0.79 | 0.46 | 0.50 | 0.44 | 0.51 | 0.50 | 0.51 |
| Angle α (deg.) | 0.0011 | 0.0336 | 0.0242 | 0.0296 | 0.0367 | 0.0324 | 0.0367 | 0.0381 | 0.0367 |
| Rz (surface out of contact with molten metal) (μm) | 0.190 | 0.156 | 0.160 | 0.135 | 0.175 |  |  |  |  |
| Rz (surface in contact with molten metal) (μm) | 0.162 | 0.123 | 0.117 | 0.114 | 0.132 |  |  |  |  |

Although the process for producing a convex sheet glass according to the present invention has been described in reference to appropriate examples, the present invention is not limited to the examples. Various modifications are possible without departing from the spirit of the present invention.

INDUSTRIAL APPLICABILITY

In accordance with the present invention, a glass ribbon advancing in a molten metal bath can be controlled so as to have a higher viscosity in a central portion in a width direction than that in both edge portions in the width direction such that the glass ribbon is appropriately produced to have a convex shape in section in the width direction wherein the glass ribbon is thin in the edge portions and thick in the central portion. Thus, it is possible to produce a convex glass applicable to various applications.

This application is a continuation of PCT Application No. PCT/JP2016/051720, filed on Jan. 21, 2016, which is based upon and claims the benefit of priority from Japanese Patent Application No. 2015-009556 filed on Jan. 21, 2015. The contents of those applications are incorporated herein by reference in their entireties.

REFERENCE SYMBOLS

21: molten metal bath, 22: molten metal, 23: roll, 23A: upstream roll, 23B: downstream roll, G2: glass ribbon, G2A: central portion of glass ribbon, G2B: edge portion of glass ribbon

What is claimed is:

1. A laminated glass for a vehicle, the laminated glass comprising:
   a first sheet glass, which is a wedge-shaped glass having one end portion thicker than other end,
   a second sheet glass, and
   an interlayer interposed between the first sheet glass and the second sheet glass,
   wherein the first sheet glass has a principal surface with a maximum height Rz of at most 0.3 μm in accordance with JIS B 0601-2001 in a roughness curve having a reference length of 25 mm.

2. The laminated glass according to claim 1, wherein a difference between a maximum value and a minimum value in a thickness of the first sheet glass is at least 0.1 mm.

3. The laminated glass according to claim 2, wherein the difference between the maximum value and the minimum value in the thickness of the first sheet glass is at least 0.2 mm.

4. The laminated glass according to claim 3, wherein the difference between the maximum value and the minimum value in the thickness of the first sheet glass is at least 0.3 mm.

5. The laminated glass according to claim 4, wherein the difference between the maximum value and the minimum value in the thickness of the first sheet glass is at least 0.5 mm.

6. The laminated glass according to claim 1, wherein the maximum height Rz of the first sheet glass is at most 0.2 nm.

7. The laminated glass according to claim 1, wherein the maximum height Rz of the first sheet glass is at most 0.16 nm.

8. The laminated glass according to claim 1, wherein the second sheet glass has a constant thickness.

9. The laminated glass according to claim 8, wherein the maximum height Rz of the first sheet glass is at most 80% of a maximum height Rz of the second sheet glass.

10. The laminated glass according to claim 1, wherein the second sheet glass comprises a wedge-shaped glass having one end portion thicker than other end.

11. The laminated glass according to claim 1, wherein the interlayer comprises polyvinyl butyral.

12. The laminated glass according to claim 1, wherein the laminated glass is part of a head-up display for displaying information on a windshield of the vehicle.

13. The laminated glass according to claim 1, wherein the maximum height Rz of the first sheet glass ranges from greater than 0.05 μm to at most 0.3 μm.

14. A windshield, comprising the laminated glass according to claim 1.

* * * * *